United States Patent
Ji

(10) Patent No.: US 10,671,866 B2
(45) Date of Patent: Jun. 2, 2020

(54) VEHICLE BLIND SPOT DETECTION SYSTEM AND CONTROL METHOD THEREOF

(71) Applicants: HYUNDAI MOTOR COMPANY, Seoul (KR); KIA MOTORS CORPORATION, Seoul (KR)

(72) Inventor: Sungmin Ji, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 11 days.

(21) Appl. No.: 15/991,030

(22) Filed: May 29, 2018

(65) Prior Publication Data

US 2019/0197324 A1    Jun. 27, 2019

(30) Foreign Application Priority Data

Dec. 27, 2017    (KR) .......................... 10-2017-0181051

(51) Int. Cl.
```
G06K 9/00      (2006.01)
B60R 1/00      (2006.01)
G01S 17/08     (2006.01)
```
(52) U.S. Cl.
CPC ............ *G06K 9/00825* (2013.01); *B60R 1/00* (2013.01); *G01S 17/08* (2013.01); *G06K 9/00805* (2013.01); *B60R 2300/802* (2013.01)

(58) Field of Classification Search
CPC .. G06K 9/00825; G06K 9/00805; B60R 1/00; G01S 17/08

USPC .......................................................... 348/148
See application file for complete search history.

(56) References Cited

U.S. PATENT DOCUMENTS

| | | | |
|---|---|---|---|
| 2010/0315214 A1* | 12/2010 | Yano ......................... | B60R 1/00 340/435 |
| 2016/0154099 A1* | 6/2016 | Saito ........................ | G01S 7/412 342/28 |
| 2018/0181824 A1* | 6/2018 | Ishii ..................... | G08G 1/0112 |

FOREIGN PATENT DOCUMENTS

| | | |
|---|---|---|
| EP | 0962906 B1 | 12/1999 |
| JP | H06-036198 A | 2/1994 |
| JP | 2006-199055 A | 8/2006 |
| JP | 2007-102691 A | 4/2007 |
| JP | 2012-203829 A | 10/2012 |
| JP | 2016-110629 A | 6/2016 |

\* cited by examiner

*Primary Examiner* — Patricia I Young
(74) *Attorney, Agent, or Firm* — Morgan, Lewis & Bockius LLP

(57) ABSTRACT

A vehicle includes: a communication device configured to receive information about a turn angle of an intersection at which the vehicle travels; an image sensor configured to photograph a reflector installed at the intersection to acquire an image of a target vehicle reflected in the reflector; and a controller configured to determine whether the target vehicle approaches the intersection, based on a change in position of the target vehicle on the image of the target vehicle, to decide an installation angle of the reflector based on the turn angle of the intersection, and to determine a position of the target vehicle reflected in the reflector based on the installation angle of the reflector.

12 Claims, 10 Drawing Sheets

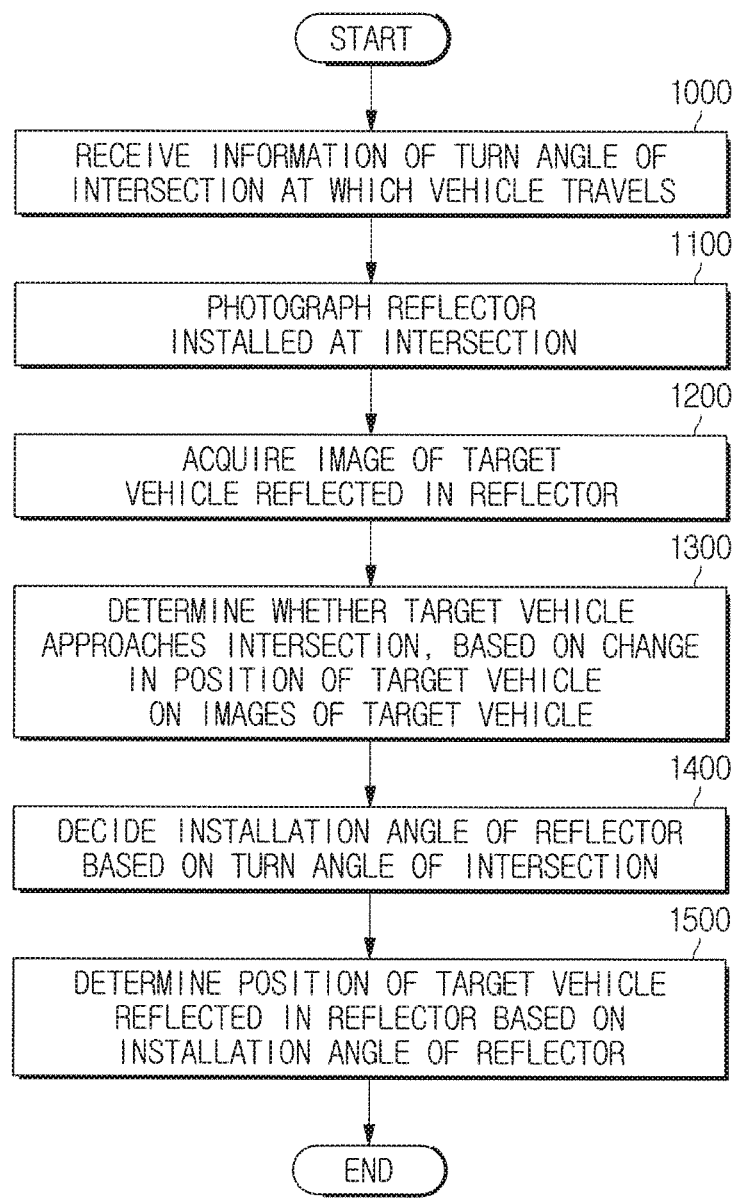

VEHICLE BLIND SPOT DETECTION SYSTEM AND CONTROL METHOD THEREOF

CROSS-REFERENCE TO RELATED APPLICATION

This application is based on and claims priority under 35 U.S.C. § 119 to Korean Patent Application No. 10-2017-0181051, filed on Dec. 27, 2017, in the Korean Intellectual Property Office, the disclosure of which is incorporated by reference herein in its entirety.

TECHNICAL FIELD

The present disclosure relates to a vehicle and a control method thereof, and more particularly, to a vehicle and a control method thereof for sensing another vehicle approaching to the vehicle in a blind spot using a reflector installed at an intersection when the other vehicle is not recognized due to an obstacle located at the intersection.

BACKGROUND

A vehicle is a transport means that runs on roads or tracks to transport humans or objects to desired places. The vehicle moves through one or more wheels generally installed in the vehicle body. Examples of vehicles include a three-wheeled vehicle, a four-wheeled vehicle, a two-wheeled vehicle such as a motorcycle, construction equipment, a bicycle, and a train running on rails installed on tracks.

In modern society, the number of peoples using vehicles as the most common transportation means is increasing. Development of vehicle technologies brought many advantages of the ease of long-distance travel, convenience in life, etc., but caused a problem of serious traffic congestion due to bad traffic in a thickly populated area such as Korea.

Lately, studies into a vehicle with Advanced Driver Assist System (ADAS) for actively providing information about a vehicle state, a driver's state, and surrounding environments are actively conducted in order to reduce drivers' burdens and increase drivers' convenience.

Examples of ADAS installed in vehicles are Cross Traffic Alert (CTA) and Rear Cross Traffic Alert (RCTA). The CTA is collision avoidance system for determining a risk of collision with opposite vehicles or turning vehicles at intersections and avoiding collision through emergency braking when there is a risk of collision.

There are cases in which a vehicle entering an intersection or a back road fails to sense another vehicle approaching in a blind spot due to an obstacle located at the intersection or on the back road since the vehicle senses the other vehicle through a sensor. Therefore, technology for estimating driving paths of other vehicles and determining approaches of the other vehicles is needed.

SUMMARY

An aspect of the present disclosure provides effective collision avoidance control by sensing another vehicle approaching in a blind spot using a reflector installed at an intersection when the other vehicle is not recognized due to an obstacle located at the intersection.

Additional aspects of the disclosure will be set forth in part in the description which follows and, in part, will be obvious from the description, or may be learned by practice of the disclosure.

In accordance with an aspect of the present disclosure, a vehicle includes: a communication device configured to receive information about a turn angle of an intersection at which the vehicle travels; an image sensor configured to photograph a reflector installed at the intersection to acquire an image of a target vehicle reflected in the reflector; and a controller configured to determine whether the target vehicle approaches the intersection, based on a change in position of the target vehicle on the image of the target vehicle, to decide a first installation angle of the reflector based on the turn angle of the intersection, and to determine a position of the target vehicle reflected in the reflector based on the first installation angle of the reflector.

The controller may calculate a relative position of the reflector based on a position of the vehicle, and calculates a relative position of the target vehicle reflected in the reflector based on the position of the vehicle.

The controller may calculate a distance between the reflector and the vehicle based on the relative position of the reflector.

When the target vehicle is at a first position, the controller may calculate a first distance between the reflector and the target vehicle based on the relative position of the reflector and the relative position of the target vehicle reflected in the reflector.

When the target vehicle is at a second position, the controller may calculate a second distance between the reflector and the target vehicle based on the relative position of the reflector and the relative position of the target vehicle reflected in the reflector.

If the first distance is longer than the second distance, the controller may determine that the target vehicle approaches the intersection, and if the first distance is shorter than the second distance, the controller may determine that the target vehicle moves away from the intersection.

The controller may decide a second installation angle of the reflector with respect to a driving direction of the vehicle, based on the relative position of the reflector.

The controller may calculate an angle between the target vehicle and an image of the target vehicle reflected in the reflector, based on the first installation angle of the reflector and the second installation angle.

The controller may acquire position information of the target vehicle based on the angle between the target vehicle and the image of the target vehicle reflected in the reflector.

In accordance with another aspect of the present disclosure, a method for controlling a vehicle includes: receiving, by a communication device, information about a turn angle of an intersection at which the vehicle travels; photographing, by an image sensor, a reflector installed at the intersection to acquire an image of a target vehicle reflected in the reflector; determining, by a controller, whether the target vehicle approaches the intersection, based on a change in position of the target vehicle on the image of the target vehicle; determining, by the controller, a first installation angle of the reflector based on the turn angle of the intersection; and determining, by the controller, a position of the target vehicle reflected in the reflector based on the first installation angle of the reflector.

The vehicle control method may further include: calculating a relative position of the reflector based on a position of the vehicle; and calculating a relative position of the target vehicle reflected in the reflector based on the position of the vehicle.

The vehicle control method may further include: calculating a distance between the reflector and the vehicle based on the relative position of the reflector.

The calculating of the distance between the reflector and the vehicle comprises, when the target vehicle is at a first position, calculating a first distance between the reflector and the target vehicle based on the relative position of the reflector and the relative position of the target vehicle reflected in the reflector.

The calculating of the distance between the reflector and the vehicle comprises, when the target vehicle is at a second position, calculating a second distance between the reflector and the target vehicle based on the relative position of the reflector and the relative position of the target vehicle reflected in the reflector.

The determining of whether the target vehicle approaches the intersection may include: determining that the target vehicle approaches the intersection if the first distance is longer than the second distance; and determining that the target vehicle moves away from the intersection if the first distance is shorter than the second distance.

The vehicle control method may further include: deciding a second installation angle of the reflector with respect to a driving direction of the vehicle, based on the relative position of the reflector.

The determining of the position of the target vehicle reflected in the reflector may include: calculating an angle between the target vehicle and the image of the target vehicle reflected in the reflector, based on the first installation angle of the reflector decided according to the turn angle of the intersection and the second installation angle of the reflector with respect to the driving direction of the vehicle.

The determining of the position of the target vehicle reflected in the reflector may include: acquiring position information of the target vehicle based on the angle between the target vehicle and the image of the target vehicle reflected in the reflector.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 10 is a flowchart illustrating a vehicle control method according to an exemplary embodiment of the present disclosure.

DETAILED DESCRIPTION

Figure 1:
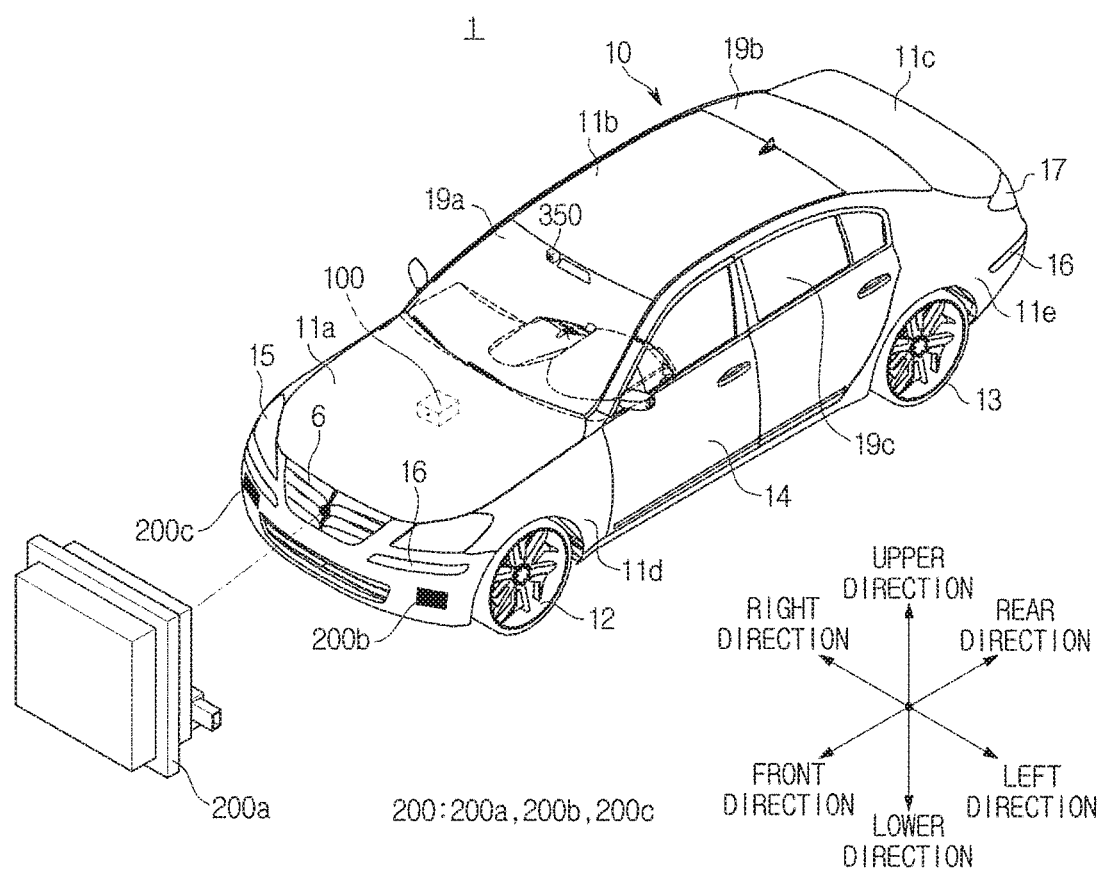
FIG. 1 is a perspective view schematically showing an outer appearance of a vehicle according to an exemplary embodiment of the present disclosure.
Figure 2:
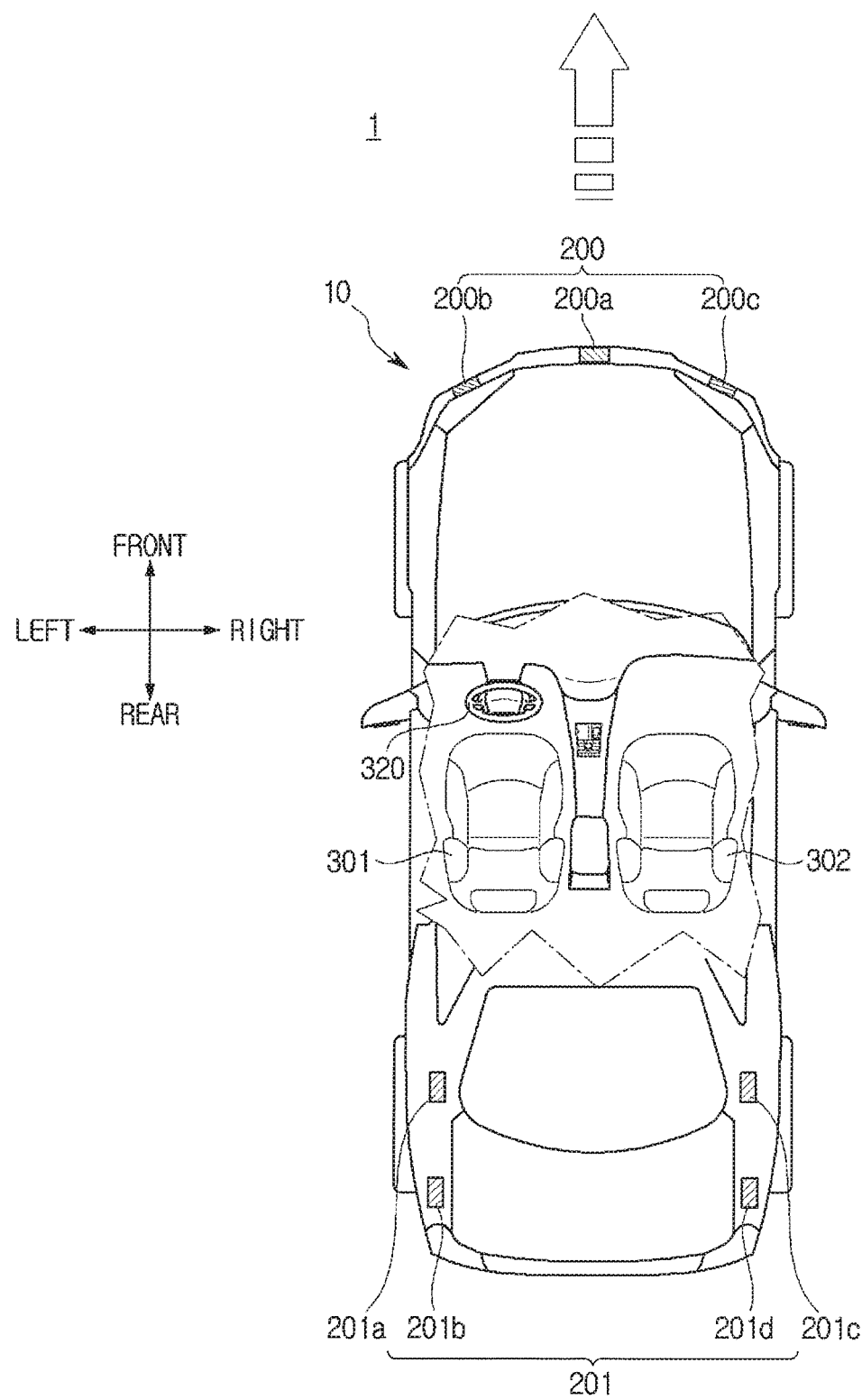
FIG. 2 shows a vehicle in which a sensor and a back-sideways sensor according to an exemplary embodiment of the present disclosure are installed.
Figure 3:
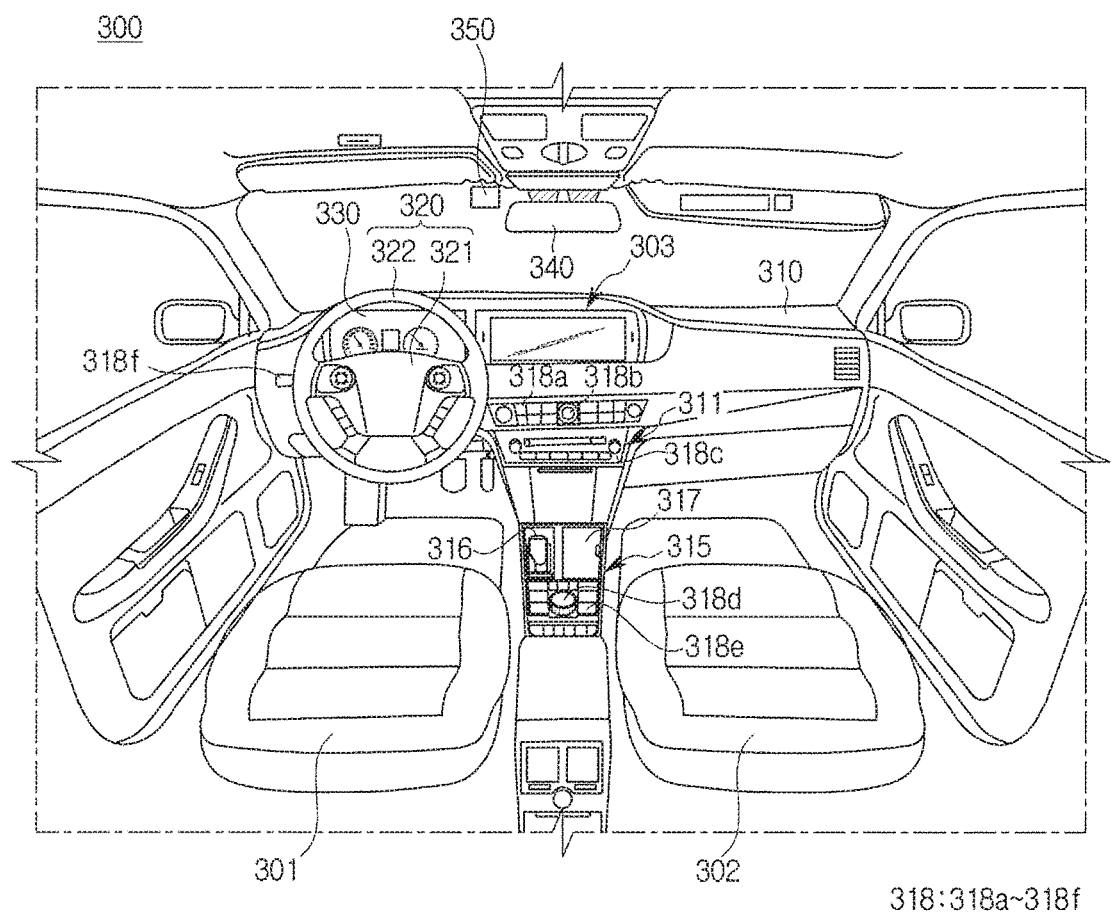
FIG. 3 shows an interior of a vehicle according to an exemplary embodiment of the present disclosure.
Figure 4:
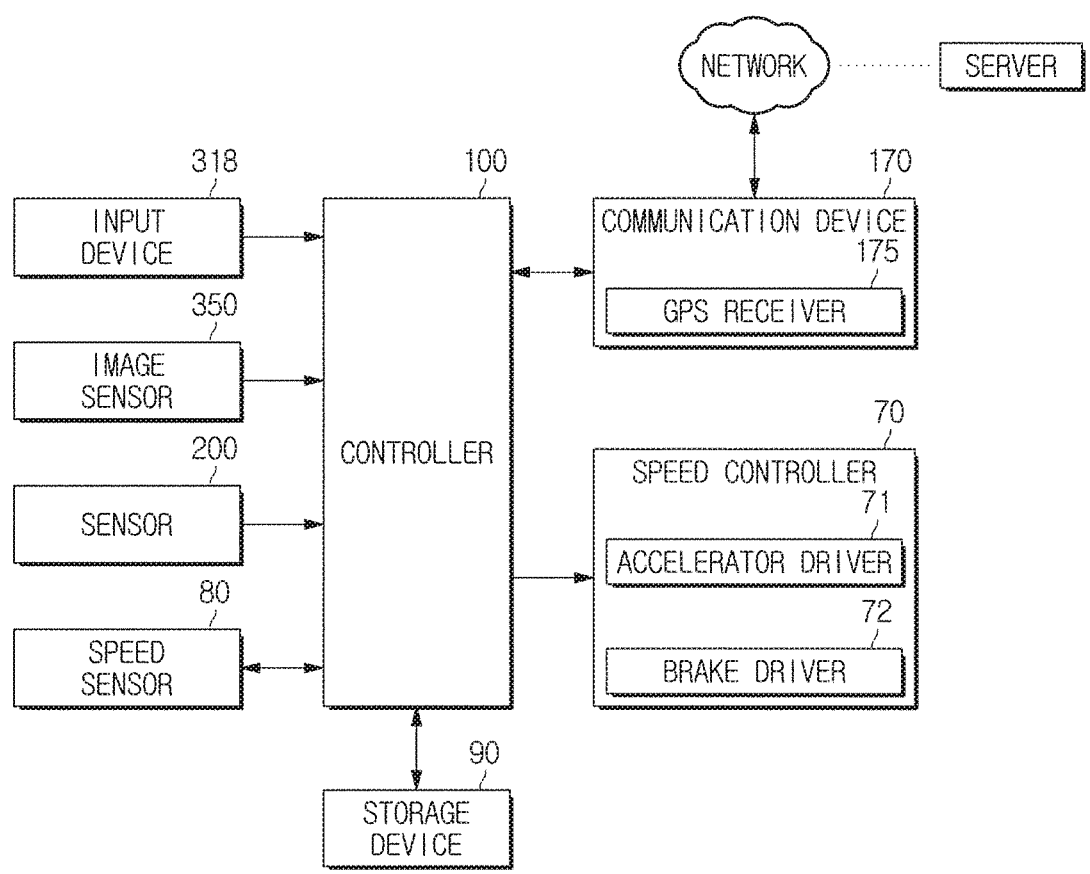
FIG. 4 is a control block diagram of a vehicle according to an exemplary embodiment of the present disclosure.

FIG. 1 is a perspective view schematically showing an outer appearance of a vehicle according to an exemplary embodiment of the present disclosure. FIG. 2 shows a vehicle in which a sensor and a back-sideways sensor according to an exemplary embodiment of the present disclosure are installed, FIG. 3 shows an interior of a vehicle according to an exemplary embodiment of the present disclosure, and FIG. 4 is a control block diagram of a vehicle according to an exemplary embodiment of the present disclosure.

In the following description, for convenience of description, as shown in FIG. 1, a direction in which the vehicle travels forward is defined as a front direction, and a direction that is opposite to the front direction is defined as a rear direction. Side directions are divided into a left direction and a right direction with respect to the front direction. If the front direction is the 12 o'clock direction, the 3 o'clock direction or directions around the 3 o'clock direction are defined as a right direction, and the 9 o'clock direction or directions around the 9 o'clock direction are defined as a left direction. Further, a direction toward the bottom of the vehicle is defined as a down direction, and a direction that is opposite to the dawn direction is defined as an up direction. In addition, a surface disposed in the front direction is defined as a front surface, a surface disposed in the rear direction is defined as a rear surface, and surfaces disposed in the side directions are defined as side surfaces. The left one of the side surfaces is defined as a left surface, and the right one is defined as a right surface.

Referring to FIG. 1, a vehicle 1 may include a vehicle body 10 forming an outer appearance of the vehicle 1, and a plurality of wheels 12 and 13 for moving the vehicle 1.

The vehicle body 10 may include a hood 11a for protecting various devices such as an engine required for driving the vehicle 1, a roof panel 11b forming the internal space of the vehicle 1, a trunk lid 11c for providing storage space, and front fenders 11d and quarter panels 11e provided at both sides of the vehicle 1. Further, a plurality of doors 14 hinge-coupled with the vehicle body 10 may be provided at both sides of the vehicle body 10.

A front window 19a for providing a front view of the vehicle 10 may be provided between the hood 11a and the roof panel 11b, and a rear window 19b for providing a back view of the vehicle 10 may be provided between the roof panel 11b and the trunk lid 11c. Further, a plurality of side windows 19c for providing side views of the vehicle 10 may be provided at the upper portions of the doors 14.

A plurality of headlamps 15 for irradiating light in a heading direction of the vehicle 10 may be provided at the front portion of the vehicle 1.

A plurality of turn signal lamps 16 for informing a movement direction of the vehicle 1 may be provided at the front and back portions of the vehicle 1.

The vehicle 1 may make the turn signal lamps 16 flickering to inform a movement direction of the vehicle 1. A plurality of tail lamps 17 may be provided at the back portion of the vehicle 1. The tail lamps 17 may inform a gear shifting state, a brake operation state, etc, of the vehicle 1.

As shown in FIGS. 1 and 3, at least one image sensor 350 may be provided in the inside of the vehicle 1. The image sensor 350 may photograph images of surroundings of the vehicle 1 when the vehicle 1 travels or stops, sense an object around the vehicle 1, and further acquire information about a kind of the object and position information of the object. The object around the vehicle 1, which can be photographed by the vehicle 1, may be another vehicle, a pedestrian, a bicycle, a moving object, or various fixed obstacles.

The image sensor 350 may photograph an object around the vehicle 1, identify a shape of the photographed object through image recognition to determine a kind of the object, and then transfer information about the kind of the object to a controller 100.

The image sensor 350 may photograph a reflector 400 (see FIG. 5) installed at an intersection to acquire an image of a target vehicle 2 (see FIG. 5) reflected in the reflector 400. That is, the image sensor 350 may acquire image information of the target vehicle 2 reflected in the reflector 400.

In FIG. 3, the image sensor 350 is disposed around a room mirror 340. However, the image sensor 350 may be disposed at any position where it can photograph the inside or outside of the vehicle 1 to acquire image information.

The image sensor 350 may be at least one camera. The image sensor 350 may be a 3Dimensional (3D) space sensor, a ladar sensor, or an ultrasonic sensor, etc., in order to acquire more precise images. The 3D space sensor may be KINECT (RGB-D sensor), TOF (Structured Light Sensor), a stereo camera, etc., although not limited to these. That is, the 3D sensor may be another device that can perform the similar function.

Further, the image sensor 350 may be an image recognition sensor for recognizing an image of an object.

Referring to FIGS. 1 and 2, the vehicle 1 may include an object detection sensor 200 for sensing an object located in the front direction to acquire at least one of position information and driving speed information of the sensed object.

The object detection sensor 200 according to an embodiment may acquire coordinate information of an object located around the vehicle 1. That is, the object detection sensor 200 may acquire coordinate information of an object, which changes when the object moves, in real time, and measure a distance between the vehicle 1 and the object.

The object detection sensor 200 may determine whether another vehicle exists or approaches in the left direction of the vehicle 1, in the right direction of the vehicle 1, in the front direction of the vehicle 1, in the rear direction of the vehicle 1, in the left front direction of the vehicle 1, in the right front direction of the vehicle 1, in the left rear direction of the vehicle 1, or in the right rear direction of the vehicle 1, using electromagnetic waves, laser light, etc. For example, the object detection sensor 200 may irradiate electromagnetic waves such as microwaves or millimeter waves, pulse laser light, ultrasonic waves, or infrared light, in the left direction of the vehicle 1, in the right direction of the vehicle 1, in the front direction of the vehicle 1, in the rear direction of the vehicle 1, in the left front direction of the vehicle 1, in the right front direction of the vehicle 1, in the left rear direction of the vehicle 1, or in the right rear direction of the vehicle 1, and receive pulse laser light, ultrasonic waves, or infrared light reflected or scattered from an object located in the directions of the vehicle 1, thereby determining whether the object exists. In this case, the object detection sensor 200 may further determine a distance to the object or speed of the object using time of arrival of the irradiated electromagnetic waves, pulse laser light, ultrasonic waves, or infrared light.

According to some embodiments, the sensor 210 may receive visible light reflected or scattered from an object existing in the left, right, or front direction of the vehicle 1 to determine whether the object exists. According to which one of electromagnetic waves, pulse laser light, ultrasonic waves, infrared light, and visible light is used, a recognition distance to another object located in the front or rear direction of the vehicle 1 may change, or weather or illuminance may have an influence on recognition.

The object detection sensor 200 may be implemented as, for example, a radar using millimeter waves or microwaves, a LiDAR using a pulse laser beam, vision using visible light, an infrared sensor using infrared light, or an ultrasonic sensor using ultrasonic waves. The object detection sensor 200 may be implemented as any one of the above-mentioned devices or as a combination of two or more of the above-mentioned devices. If the vehicle 1 includes a plurality of object detection sensors 200, the object detection sensors 200 may be implemented as the same kind of devices or as different kinds of devices. Various devices and a combination thereof, which can be considered by a designer, may be used to implement the object detection sensor 200.

The object detection sensor 200 may sense the target vehicle 2 traveling around the vehicle 1. However, if the vehicle 1 travelling at an intersection or on a back road fails to sense the target vehicle 2 approaching in a blind spot due to an obstacle located at the intersection or on the back road, the vehicle 1 may have difficulties in performing collision avoidance control for the target vehicle.

Accordingly, the vehicle 1 and the control method thereof according to an embodiment can sense the target vehicle 2 through a reflector installed at an intersection or on a back road, even when the object detection sensor 200 fails to sense the target vehicle 2 due to an obstacle located at the intersection or on the back road.

Referring to FIG. 3, in an interior 300 of the vehicle 1, a driver seat 301, a passenger seat 302, a dashboard 310, a steering wheel 320, and an instrument panel 330 may be provided.

The dashboard 310 may partition an engine room from the interior 300 of the vehicle 1, and accommodate various kinds of components for driving. The dashboard 310 may be located in front of the driver seat 301 and the passenger seat 302. The dashboard 310 may include an upper panel, a center fascia 311, a gear box 315, etc.

On the upper panel of the dashboard 310, a display 303 may be installed. The display 303 may provide various information in the form of images for a driver or passenger of the vehicle 1. For example, the display 303 may visually provide various information, such as a map, weather, news, various moving images or still images, various information (for example, information about an air conditioner) related to the state or operations of the vehicle 1, etc. The display 303 may provide a warning according to a degree of danger for the driver or passenger. More specifically, when the vehicle 1 changes lanes, the display 303 may provide different warnings according to different degrees of danger for the driver or passenger.

The display 303 may visually provide the driver with a warning for a risk of collision according to a degree of risk of collision with the target vehicle 2 traveling on a lane on which the vehicle 1 travels. Further, when the vehicle 1 intends to enter an intersection or a back road, the display 303 may provide the driver with a warning for a risk of collision with the target vehicle 2 traveling at the intersection or on the back road.

The display 303 may be implemented with navigation system.

The display 303 may be installed in a housing integrated into the dashboard 310, and only the display panel of the display 303 may be exposed to the outside. The display 303 may be installed in the middle or lower portion of the center fascia 311. Or, the display 303 may be installed on the inner surface of a wind shield (not shown), or on the upper surface of the dashboard 310 using a separate support (not shown). That is, the display 303 may be installed at any other position that can be considered by a designer.

In the inside of the dashboard 310, various kinds of devices, such as a processor, a communication module, a Global Positioning System (GPS) receiver module, a storage device, etc., may be installed. The processor installed in the vehicle 1 may be configured to control various electronic devices installed in the vehicle 1, or to perform the functions of the controller 100 as described above. The above-described devices may be implemented with various components, such as a semiconductor chip, a switch, an integrated circuit, a resistor, volatile or nonvolatile memory, a Printed Circuit Board (PCB), etc.

The center fascia 311 may be disposed in the center of the dashboard 310, and include input devices 318a to 318c to enable the driver to input various commands related to operations of the vehicle 1. The input devices 318a to 318c may be implemented as physical buttons, knobs, a touch pad, a touch screen, stick type manipulating devices, track balls, etc. The driver may manipulate the input devices 318a to 318c to control various operations of the vehicle 1.

The gear box 315 may be disposed between the driver seat 301 and the passenger seat 302 below the center fascia 311. In the gear box 315, a gear 316, a storage compartment 317, and various input devices 318d and 318e may be installed. The input devices 318d and 318e may be implemented as physical buttons, a knob, a touch pad, a touch screen, stick type manipulating devices, track balls, etc. The storage compartment 317 and the input devices 318d and 318e may be omitted according to some embodiments.

In a portion of the dashboard 310 positioned in front of the driver seat 30 steering wheel 320 and the instrument panel 330 may be disposed.

The steering wheel 320 may be rotatable in predetermined directions according to the driver's manipulation, and the front or rear wheels of the vehicle 1 may rotate according to the rotation direction of the steering wheel 320 so as to steer the vehicle 1. The steering wheel 320 may include a spoke 321 connected to a rotation axis, and a handle wheel 322 connected to the spoke 321. In the spoke 321, input means may be disposed to allow the driver to input various commands, and the input means may be implemented as a physical button, a knob, a touch pad, a touch screen, a stick type manipulating device, a track ball, etc. The handle wheel 322 may be in the shape of a circle for the driver's convenience, although not limited to this. In the inner side of at least one of the spoke 321 and the handle wheel 322, a vibrating unit 201 (see FIG. 2) may be disposed so that the at least one of the spoke 321 and the handle wheel 322 can vibrate with a predetermined strength according to external control. According to an embodiment, the vibrating unit 201 may vibrate with different strengths according to external control signals, so that at least one of the spoke 321 and the handle wheel 322 can vibrate with different strengths according to the external control signals. The vehicle 1 may provide the driver with haptic warnings using the different strengths of vibration. For example, at least one of the spoke 321 and the handle wheel 322 may vibrate with a degree of strength corresponding to a degree of danger decided when the vehicle 1 changes lanes to thereby provide various warnings to the user. More specifically, at least one of the spoke 321 and the handle wheel 322 may vibrate more strongly at a higher degree of danger so as to provide a high level of warning to the driver.

A turn signal input device 318f may be disposed in the rear side of the steering wheel 320. The driver may input a signal for changing a driving direction or a lane through the turn signal input device 318f, while driving the vehicle 1.

The instrument panel 330 may provide the driver with various information related to the vehicle 1, such as speed of the vehicle 1. Revolutions Per Minute (RPM) of the engine, fuel gauge, the temperature of engine oil, information about turning on/off of the turn signal lamps, a mileage, etc. The instrument panel 330 may be implemented with lights, scale plates, etc. According to an embodiment, the instrument panel 330 may be implemented with a display panel. If the instrument panel 330 is implemented with a display panel, the instrument panel 330 may display more various information, such as fuel efficiency, and information about whether one(s) of various functions installed in the vehicle 1 is performed, as well as the above-mentioned information, for the driver. According to an embodiment, the instrument panel 330 may output different warnings according to different degrees of danger of the vehicle 1 for the driver. More specifically, when the vehicle 1 changes lanes, the instrument panel 330 may provide the driver with a predetermined warning corresponding to a decided degree of danger.

Referring to FIG. 4, the vehicle 1 according to an embodiment of the present disclosure may include a input device 318, which includes the various input devices 318a-318f, a speed controller 70 for adjusting driving speed of the vehicle 1 which the driver drives, a speed sensor 80 for sensing driving speed of the vehicle 1, a storage device 90 for storing data related to the control of the vehicle 1, and a controller 100 for controlling the individual components of the vehicle 1 and controlling driving speed of the vehicle 1.

The speed controller 70 may adjust speed of the vehicle 1 which the driver drives. The speed controller 70 may include an accelerator driver 71 and a brake driver 72.

The accelerator driver 71 may drive an accelerator by receiving a control signal from the controller 100 to increase speed of the vehicle 1, and the brake driver 72 may drive brakes by receiving a control signal from the controller 100 to decrease speed of the vehicle 1.

The speed sensor 80 may sense driving speed of the vehicle 1 which the driver drives, under the control of the controller 100. That is, the speed sensor 80 may estimate driving speed of the vehicle 1 based on speed at which the wheels of the vehicle 1 rotate, wherein the driving speed may be expressed in unit of kph representing a movement distance (km) per unit time (h).

The storage device 90 may store various data related to the control of the vehicle 1. More specifically, the storage device 90 may store information about driving speed, a driving distance, and driving time of the vehicle 1 according to an embodiment, and also store information about a kind and position of an object sensed by the image sensor 350.

The storage device 90 may store position information and speed information of an object sensed by the object detection sensor 200, and also store coordinate information of a moving object, which changes in real time, information about a relative distance to an object, and information about relative speed of an object with respect to the vehicle 1.

In addition, the storage device 90 may store data related to formulas and control algorithms for controlling the vehicle 1 according to an embodiment, and the controller 100 may transmit control signals for controlling the vehicle 1 according to the formulas and control algorithms.

The storage device 90 may be implemented as at least one of storage media, such as a cache, Read Only Memory (ROM), Programmable Read Only Memory (PROM), Erasable Programmable Read Only Memory (EPROM), Electrically Erasable Programmable ROM (EEPROM), a non-volatile memory device such as flash memory, a volatile memory device such as Random Access Memory (RAM), Hard Disk Drive (HDD), and Compact Disc Read-Only Memory (CD-ROM), although not limited to these. The storage device 90 may be memory implemented as a separate chip from the processor described above in regard of the controller 100, or the storage device 90 and the processor may be integrated into a single chip.

Referring to FIG. 10, a communication device 170 may receive information of a turn angle of an intersection at which the vehicle 1 travels, in operation 1000. That is, the communication device 170 may receive information about the radius of curvature at which the vehicle 1 needs to turn left or right on a road on which it travels, and acquire information of a turn angle of the intersection based on the radius of curvature.

The communication device 170 may receive information about a position and type of a road on which the vehicle 1 travels currently, from an external server connected to a network, and also receive information about a position of a structure such as a reflector installed on the road, from the external server.

In the present disclosure, the communication device 170 may be a hardware device and connected as a separate device or embedded in the controller 100. The communication device 170 can transmit an analog or digital signal over wire or wirelessly and may include one or more components that enable communication with an external device. Examples of the communication device 170 include Bluetooth devices, infrared devices, modem, network card (using Ethernet), smartphone, Wi-Fi devices (using a Wi-Fi router), etc. Here, the communication device 170 may include a communication module that supports a communication interface with electrical equipment. The communication module may include a short-range communication module, wired communication module, wireless communication module, and the like, and may receive information detected by the sensors in the vehicle 1 and receive status information of the vehicle 1. In addition, the communication module may include a control circuit such as an integrated circuit (IC) chip.

The communication module may include a module supporting a vehicle network communication, such as a controller area network (CAN) communication, a local interconnect network (LIN) communication, a Flex-ray communication, etc.

The communication module may include a module for a wireless Internet access or a module for a short range communication. As a wireless internet technology, a wireless LAN (WLAN), a wireless broadband (Wibro), a Wi-Fi, a world interoperability for microwave access (Wimax), and the like may be used, and a Bluetooth, a ZigBee, an ultra-wideband (UWB), a radio frequency identification (RFID), an infrared data association (IrDA), and the like may be used as a short range communication technology.

A GPS receiver 175 included in the communication device 170 may receive GPS information about a current position and a driving path of the vehicle 1. The GPS receiver 175 may receive map information of the road on which the vehicle 1 travels.

In the inside of the vehicle 1, at least one controller 100 may be installed. The controller 100 may perform electronic control on the individual components related to operations of the vehicle 1.

Figure 5:
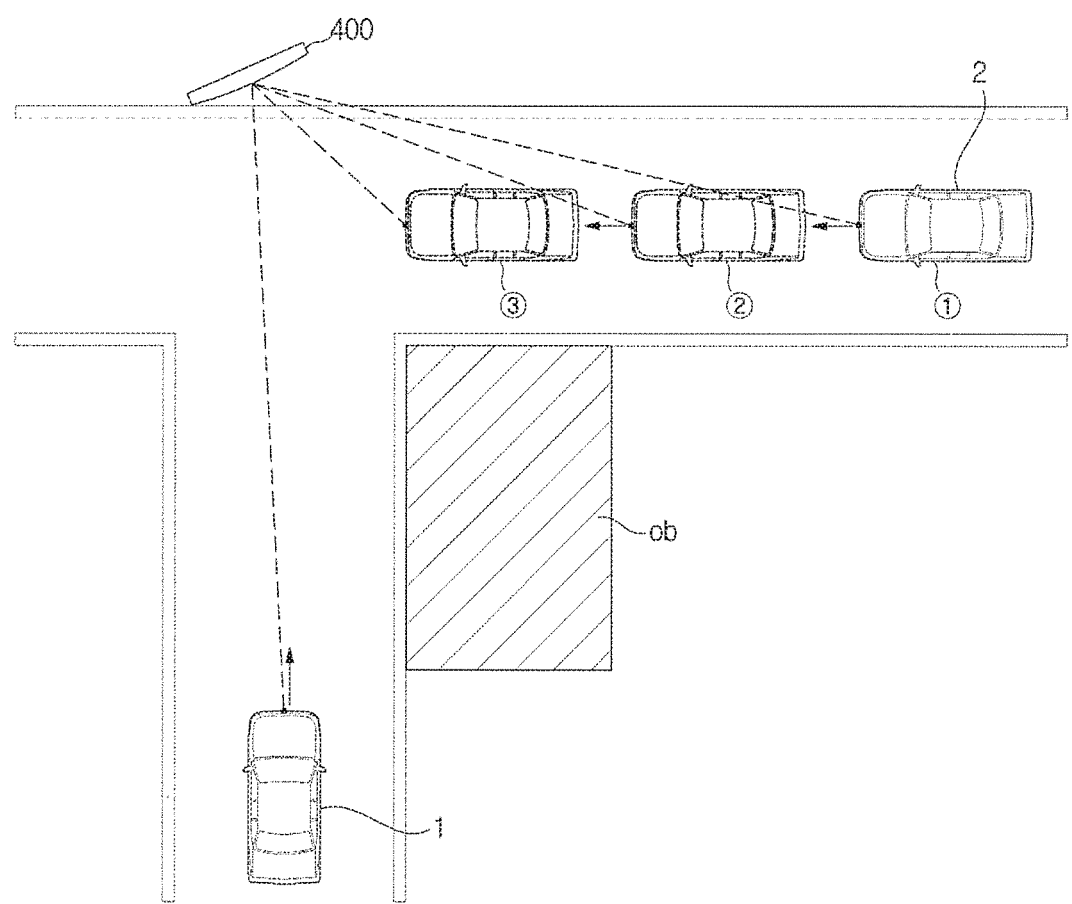
FIG. 5 is a view for describing a method for sensing a target vehicle by photographing a reflector installed at an intersection, according to an exemplary embodiment of the present disclosure.
Figure 6:
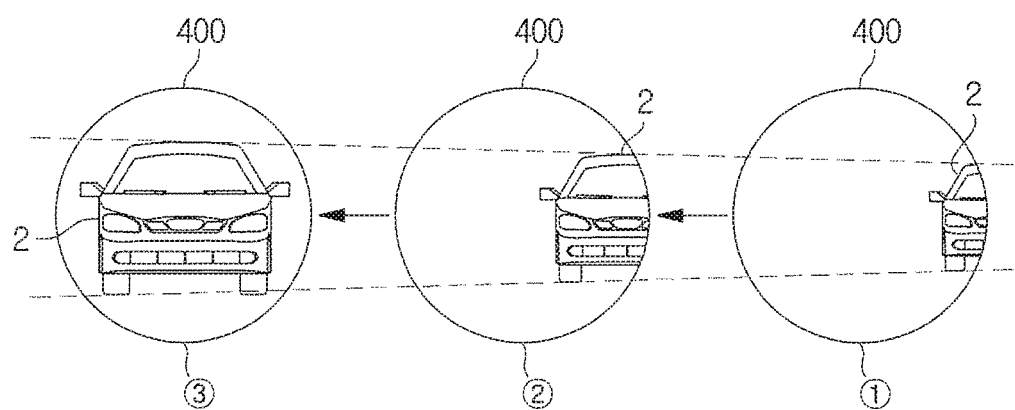
FIG. 6 is a view for describing a method for acquiring an image of a target vehicle reflected in a reflector, according to an exemplary embodiment of the present disclosure.
Figure 7:
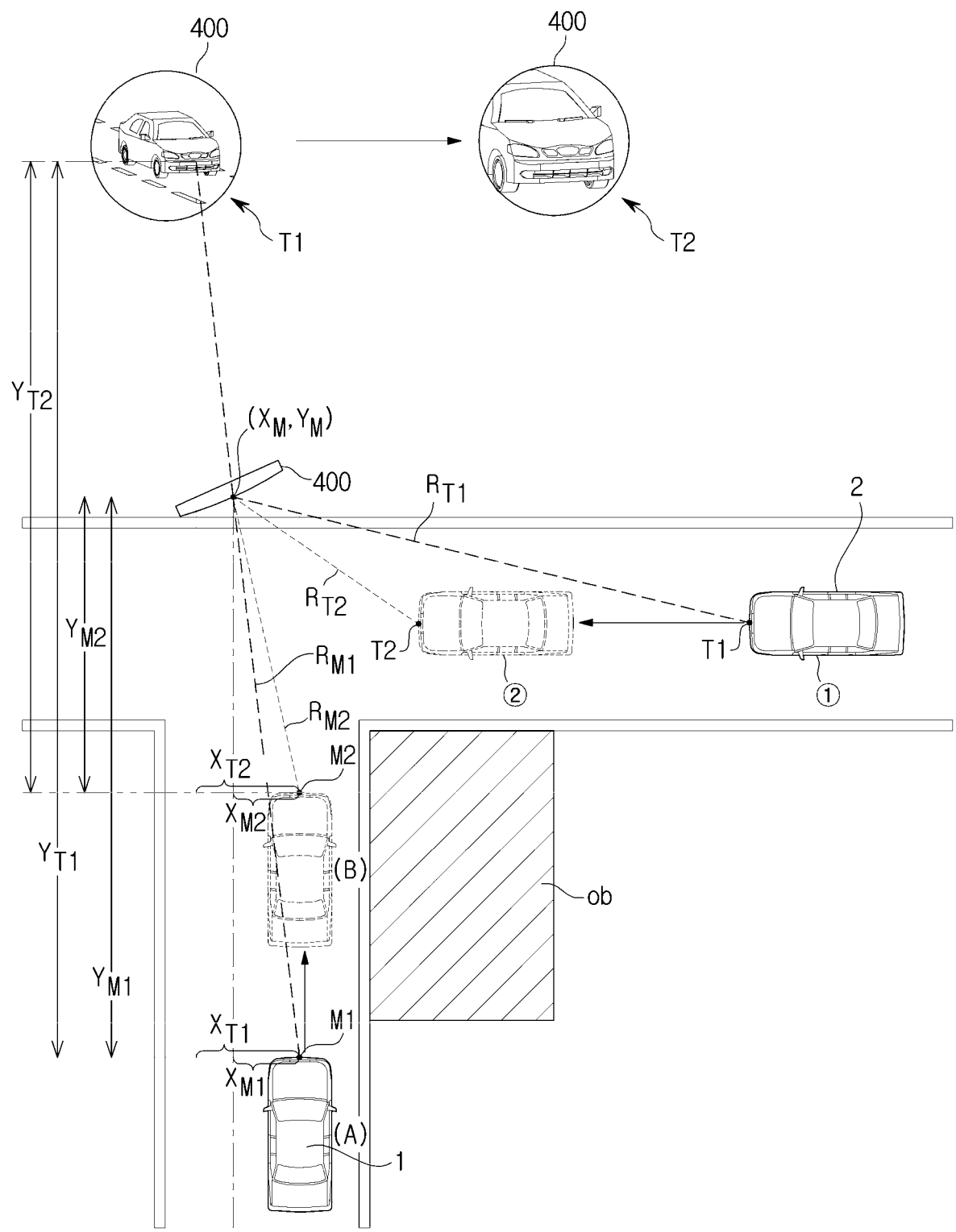
FIGS. 7 and 8 are views for describing a method for determining whether a target vehicle approaches an intersection, based on an image of the target vehicle reflected in a reflector, according to an exemplary embodiment of the present disclosure.
Figure 8:
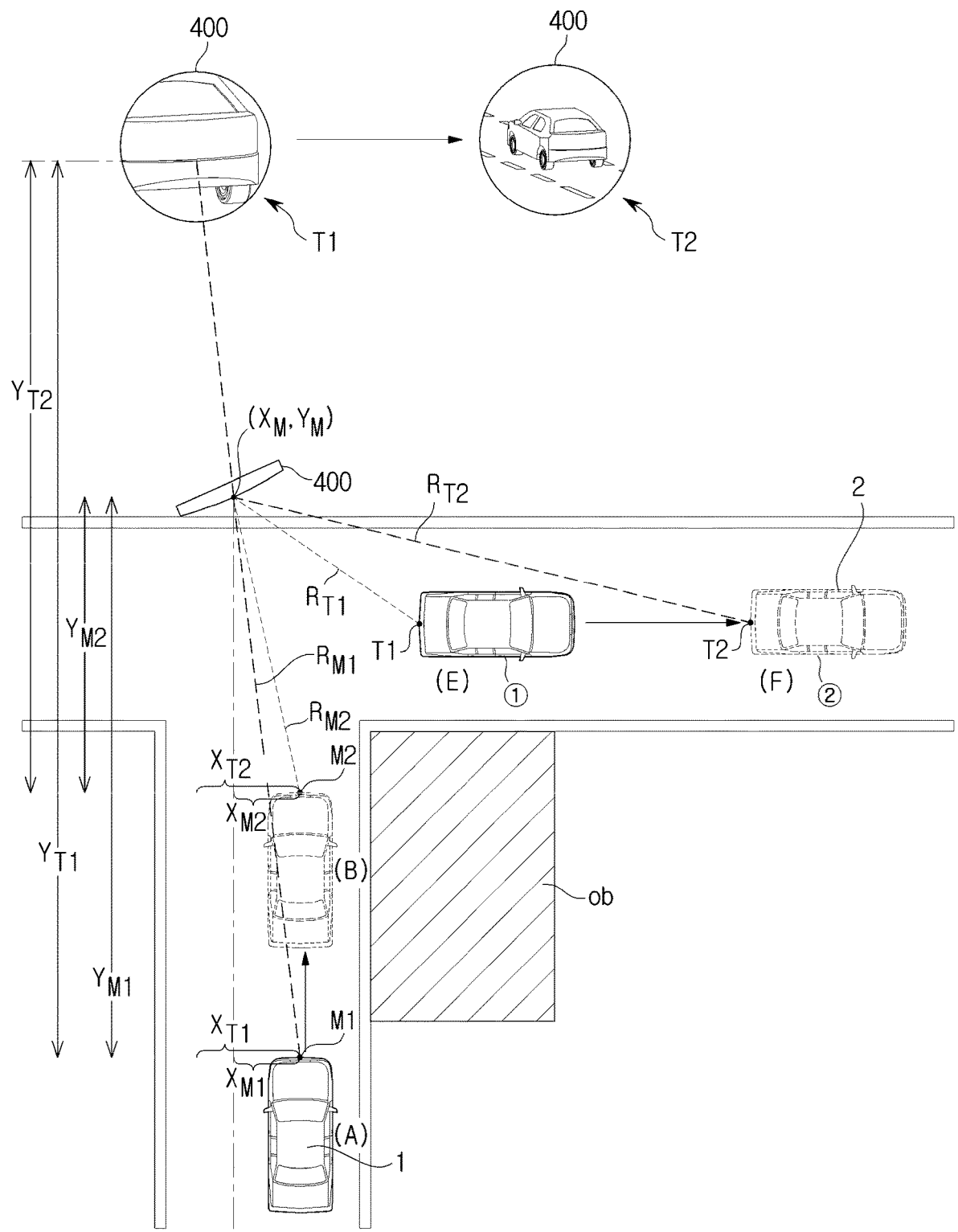
Figure 9:
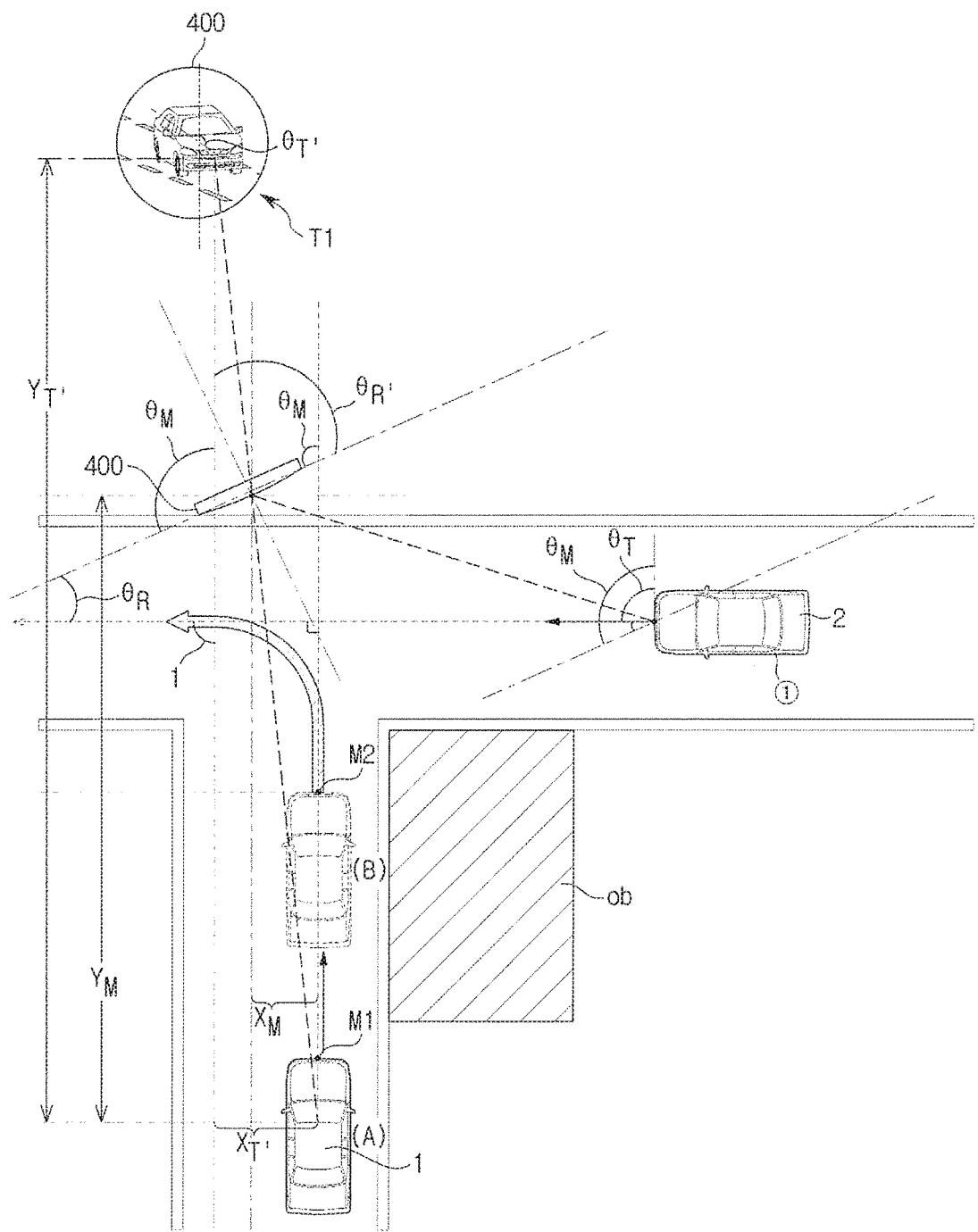
FIG. 9 is a view for describing a method for determining a position of a target vehicle reflected in a reflector, according to an exemplary embodiment of the present disclosure.

FIG. 5 is a view for describing a method for sensing a target vehicle by photographing a reflector installed at an intersection, according to an embodiment, and FIG. 6 is a view for describing a method for acquiring an image of a target vehicle reflected in a reflector, according to an embodiment, FIGS. 7 and 8 are views for describing a method for determining whether a target vehicle approaches an intersection, based on an image of the target vehicle reflected in a reflector, according to an embodiment. FIG. 9 is a view for describing a method for determining a position of a target vehicle reflected in a reflector, according to an embodiment. FIG. 10 is a flowchart illustrating a vehicle control method according to an embodiment.

Referring to FIG. 5, when an obstacle ob such as a building exists at an intersection when the vehicle 1 travels at the intersection, the object detection sensor 200 installed in the vehicle 1 may fail to sense a target vehicle 2 approaching the intersection in a blind spot.

Accordingly, the controller 100 may control the image sensor 350 installed in the vehicle 1 to photograph a reflector 400 installed at the intersection, in operation 1100, thus acquiring an image of the target vehicle 2 reflected in the reflector 400, in operation 1200.

The image sensor 350 may photograph the reflector 400 to acquire image information of the target vehicle 2 reflected in the reflector 400, and map the image information of the target vehicle 2 to image information of the target vehicle 2 stored in the storage device 90 to thereby identify the target vehicle 2 approaching the intersection.

Referring to FIGS. 5 and 6, when the target vehicle 2 runs from a position (①) to a position (③), the target vehicle 2 gets closer to the reflector 400. Accordingly, an image of the target vehicle 2 reflected in the reflector 350, photographed by the image sensor 350, may change as the target vehicle 400 moves, as shown in FIG. 6

There may be various embodiments of the reflector 400 installed at the intersection, according to installation positions and angles of the reflector 400. Accordingly, images of the target vehicle 2, acquired when the image sensor 350 photographs the reflector 400, may also have various forms and sizes according to the installation positions and angles of the reflector 400.

The controller 100 may receive an image of the target vehicle 2, acquired by the image sensor 350, and perform image analysis on the image of the target vehicle 2 to thereby determine that an object approaching the intersection is the taraet vehicle 2.

That is, as shown in FIG. 6, when the target vehicle 2 is located at the position (①), the controller 100 may analyze an image of the target vehicle 2 reflected in the reflector 400 to determine that an object reflected in the reflector 400 is not the target vehicle 2. As the target vehicle 2 moves towards the position (③) via a position (②), an image of the object reflected in the reflector 400 and photographed by the image sensor 350 may get similar to the shape of the target vehicle 2, and accordingly, the controller 100 may determine that the object approaching the intersection is the target vehicle 2, based on an image of the target vehicle 2 photographed when the target vehicle 2 is at the position (②) or (③).

Referring to FIGS. 7 and 10, the controller 100 may determine whether the target vehicle 2 approaches the intersection, based on a change in position of the target vehicle 1 on images of the target vehicle 1, acquired by the image sensor 350, in operation 1300.

The controller 100 may calculate a relative position of the reflector 400 installed at the intersection, with respect to a position of the vehicle 1. The controller 100 may calculate a relative position of the target vehicle 2 reflected in the reflector 400, with respect to the position of the vehicle 1

Referring to FIG. 7, when the vehicle 1 is located at a position (A), coordinates of a relative position of the reflector 400 with respect to a position M1 of the vehicle 1 may be defined as ($X_{M1}$, $Y_{M1}$). That is, an X coordinate of the relative position of the reflector 400 with respect to the position M1 of the vehicle 1 may correspond to $X_{M1}$, and an Y coordinate of the relative position of the reflector 400 with respect to the position M1 of the vehicle 1 may correspond to $Y_{M1}$. Accordingly, a horizontal length to the reflector 400 from the position M1 of the vehicle 1 may be $X_{M1}$, and a vertical length to the reflector 400 from the position M1 of the vehicle 1 may be $Y_{M1}$.

The controller 100 may calculate a distance $R_{M1}$ between the vehicle 1 and the reflector 400 based on the relative position of the reflector 400. That is, when the vehicle 1 is located at the position (A), the controller 100 may calculate the distance $R_{M1}$ between the vehicle 1 and the reflector 400, according to Equation (1), below.

$$X_{M1}^2 + Y_{M1}^2 = R_{M1}^2 \qquad \text{Equation (1)}$$

Referring to FIG. 7, when the vehicle 1 is located at a position (B), coordinates of a relative position of the reflector 400 with respect to a position M2 of the vehicle 1 may be defined as ($X_{M2}$, $Y_{M2}$). That is, an X coordinate of the relative position of the reflector 400 with respect to the position M2 of the vehicle 1 may correspond to $X_{M2}$, and an Y coordinate of the relative position of the reflector 400 with respect to the position M2 of the vehicle 1 may correspond to $Y_{M2}$. Accordingly, a horizontal length to the reflector 400 from the position M2 of the vehicle 1 may be $X_{M2}$, and a vertical length to the reflector 400 from the position M2 of the vehicle 1 may be $Y_{M2}$.

The controller 100 may calculate a distance $R_{M2}$ between the vehicle 1 and the reflector 400 based on the relative position of the reflector 400. That is, when the vehicle 1 is located at the position (B), the controller 100 may calculate the distance $R_{M2}$ between the vehicle 1 and the reflector 400, according to Equation (2), below.

$$X_{M2}^2 + Y_{M2}^2 = R_{M2}^2 \qquad \text{Equation (2)}$$

Referring to FIG. 7, when the vehicle 1 is located at the position (A), coordinates of a relative position of the target vehicle 2 reflected in the reflector 400 with respect to the position M1 of the vehicle 1 may be defined as ($X_{T1}$, $Y_{T1}$). That IS, an X coordinate of the relative position of the target vehicle 2 reflected in the reflector 400 with respect to the position M1 of the vehicle 1 may correspond to $X_{T1}$, and an Y coordinate of the relative position of the target vehicle 2 reflected in the reflector 400 with respect to the position M1 of the vehicle 1 may correspond to $Y_{T1}$. Accordingly, a horizontal length to the target vehicle 2 reflected in the reflector 400 from the position M1 of the vehicle 1 may be $X_{T1}$, and a vertical length to the target vehicle 2 reflected in the reflector 400 from the position M1 of the vehicle 1 may be $Y_{T1}$.

The controller 100 may calculate a distance $R_{T1}$ between the reflector 400 and the target vehicle 2 based on the relative position of the target vehicle 2 reflected in the reflector 400. That is, since the distance $R_{T1}$ between the reflector 400 and the target vehicle 2 is identical to a distance to an image of the target vehicle 2 reflected in the reflector 400 as the vehicle 1 sees the reflector 400, the controller 100 may calculate a distance between the target vehicle 2 and the reflector 400, the distance changing when the target vehicle 2 moves.

Accordingly, when the vehicle 1 is located at the position (A) and the target vehicle 2 is located at a position (C), the controller 100 may calculate the distance $R_{T1}$ between the target vehicle 2 and the reflector 400 according to Equation (3) and Equation (4), below. As the target vehicle 2 moves to get closer to the reflector 400, an image of the target vehicle 2 reflected in the reflector 400 may look larger. That is, as shown in FIG. 7, as the target vehicle 2 moves from the position (C) to a position (D), an image of the target vehicle 2 reflected in the reflector 400 may look larger.

Referring to FIG. 7, when the vehicle 1 is located at the position (B), coordinates of a relative position of the target vehicle 2 reflected in the reflector 400 with respect to the position M2 of the vehicle 1 may be defined as ($X_{T2}$, $Y_{T2}$). That is, an X coordinate of the relative position of the target vehicle 2 reflected in the reflector 400 with respect to the position M2 of the vehicle 1 may correspond to $X_{T2}$, and an Y coordinate of the relative position of the target vehicle 2 reflected in the reflector 400 with respect to the position M2 of the vehicle 1 may correspond to $Y_{T2}$. Accordingly, a horizontal length to the target vehicle 2 reflected in the reflector 400 from the position M2 of the vehicle 1 may be $X_{T2}$, and a vertical length to the target vehicle 2 reflected in the reflector 400 from the position M2 of the vehicle 1 may be $Y_{T2}$.

The controller 100 may calculate a distance $R_{T2}$ between the reflector 400 and the target vehicle 2 based on the relative position of the target vehicle 2 reflected in the reflector 400.

Accordingly, when the vehicle 1 is located at the position (B), and the target vehicle 2 is located at the position (D), the controller 100 may calculate the distance $R_{T2}$ between the target vehicle 2 and the reflector 400, according to Equation (3) and Equation (4), below.

$$(X_{T1} - X_{M1})^2 + (Y_{T1} - Y_{M1})^2 = R_{T1}^2 \cdot \alpha \qquad \text{Equation (3)}$$

$$(X_{T2} - X_{M2})^2 + (Y_{T2} - Y_{M2})^2 = R_{T2}^2 \cdot \alpha \qquad \text{Equation (4)}$$

The controller 100 may determine whether the target vehicle 2 approaches the intersection, based on the distances $R_{T1}$ and $R_{T2}$ between the target vehicle 2 and the reflector 400 calculated according to Equation (3) and Equation (4).

That is, the controller 100 may calculate distances between the target vehicle 2 and the reflector 400, based on positions of the target vehicle 2 changing when the target vehicle 2 travels, and compare the distances between the target vehicle 2 and the reflector 400 to determine whether the target vehicle 2 approaches the intersection or moves away from the intersection.

The positions of the target vehicle 2 at the positions (C) and (D) are referred to as a first position and a second position, respectively, and a distance between the reflector 400 and the target vehicle 2 at the first position and a distance between the reflector 400 and the target vehicle 2 at the second position are referred to as a first distance $R_{T1}$ and a second distance $R_{T2}$, respectively. In this case, the controller 100 may compare the first distance $R_{T1}$ to the second distance $R_{T2}$ to determine whether the target vehicle 2 approaches the intersection.

If the first distance $R_{T1}$ between the reflector 400 and the target vehicle 2 is longer than the second distance $R_{T2}$, the controller 100 may determine that the target vehicle 2 approaches the intersection, and if the first distance $R_{T1}$ is shorter than the second distance $R_{T2}$, the controller 100 may determine that the target vehicle 2 moves away from the intersection.

As shown in FIG. 7, when the target vehicle 2 moves from the position (C) to the position (D) to approach the intersection, the first distance $R_{T1}$ between the reflector 400 and the target vehicle 2 may be longer than the second distance $R_{T2}$. Accordingly, the controller 100 may determine that the target vehicle 2 reflected in the reflector 400 approaches the intersection.

Meanwhile, as shown in FIG. 8, when the target vehicle 2 moves from a position (E) to a position (F) to move away from the intersection, the first distance $R_{T1}$ between the reflector 400 and the target vehicle 2 may be shorter than the second distance $R_{T2}$. Therefore, the controller 100 may determine that the target vehicle 2 reflected in the reflector 400 moves away from the intersection. As shown in FIG. 8, the target vehicle 2 may travel in a direction that is opposite to a direction shown in FIG. 7, to move from the position (E) to the position (F). The target vehicle 2 may reverse to move away from the intersection.

As the target vehicle 2 travels to move away from the reflector 400, the target vehicle 2 reflected in the reflector 400 may become smaller. That is, as shown in FIG. 8, when the target vehicle 2 moves from the position (E) to the position (F), the target vehicle 2 reflected in the reflector 400 may look smaller.

Referring to FIGS. 9 and 10, the controller 100 may decide an installation angle of the reflector 400 based on a turn angle of the intersection, wherein information about the turn angle of the intersection is received by the communication device 170, in operation 1400. The controller 100 may determine a position of the target vehicle 2 reflected in the reflector 400 based on the installation angle of the reflector 400, in operation 1500.

The controller 100 may decide an installation angle $\theta_M$ of the reflector 400 with respect to a driving direction of the vehicle 1, based on a relative position of the reflector 400. As described above, coordinates of the relative position of the reflector 400 with respect to the position of the vehicle 1 may be defined as $(X_{m1}, Y_{M1})$.

The controller 100 may decide an installation angle $\theta_M$ of the reflector 400 based on a road type according to road information received by the communication device 170.

If a position of the target vehicle 2 reflected in the reflector 400 is $(X_T', Y_T')$, and an angle of the target vehicle 2 with respect to a driving direction of the vehicle 1 is $\theta_T'$, the controller 100 may decide an angle between the reflector 400 and the target vehicle 2, as $\theta_R$. As shown in FIG. 9, since $\theta_R$ is equal to $\theta_R'$, the controller 100 may decide a difference between the angle $\theta_T'$ of the target vehicle 2 with respect to a driving direction of the vehicle 1 and the installation angle $\theta_M$ of the reflector 400, as $\theta_R'$. That is, $\theta_T' - \theta_M = \theta_R'$.

If an actual position of the target vehicle 2 is $(X_T, Y_T)$ and an actual angle of the target vehicle 2 with respect to a driving direction of the vehicle 1 is $\theta_T$, the controller 100 may perform rotation transformation on the angle $\theta_R$ between the reflector 400 and the target vehicle 2, as expressed by Equation (5), to acquire information about the actual position $(X_T, Y_T)$ of the target vehicle 2.

$$\begin{pmatrix} \cos\theta_R & -\sin\theta_R \\ \sin\theta_R & \cos\theta_R \end{pmatrix} \begin{pmatrix} X_T' - X_M \\ Y_T' - Y_M \end{pmatrix} (\alpha) + \begin{pmatrix} X_M \\ Y_M \end{pmatrix} = \begin{pmatrix} X_T \\ Y_T \end{pmatrix} \quad \text{Equation (5)}$$

The controller 100 may obtain a difference between the installation angle $\theta_M$ of the reflector 400 and the angle $\theta_R$ of the target vehicle 2 with respect to the reflector 400 to calculate an actual angle $\theta_T$ of the target vehicle 2 with respect to the driving direction of the vehicle 1. That is, $\theta_T' - \theta_M = \theta_R$ and $\theta_M - \theta_R = \theta_T$. For example, if $\theta_T'$ is 180° and $\theta_M$ is 135°, $\theta_R$ may become 45° and $\theta_T$ may become 90°.

The controller 100 may decide the actual position $(X_T, Y_T)$ of the target vehicle 2 and the actual angle $\theta_T$ of the target vehicle 2 with respect to the driving direction of the vehicle 1, based on the installation angle $\theta_M$ of the reflector 400, the position $(X_T', Y_T')$ of the target vehicle 2 reflected in the reflector 400, and the angle $\theta_T'$ of the target vehicle 2 with respect to the driving direction of the vehicle 1, as described above.

The controller 100 may apply collision avoidance system for preventing collision between the vehicle 1 and the target vehicle 2 at the intersection, based on the actual position $(X_T, Y_T)$ of the target vehicle 2 and the actual angle $\theta_T$ of the target vehicle 2.

That is, the controller 100 may estimate an actual position and an actual angle of the target vehicle 2 reflected in the reflector 400, and when there is a risk of collision with the target vehicle 2, the controller 100 may output a warning for a driver, audiovisually. Further, the controller 100 may change time at which brake control for the vehicle 1 starts to prevent collision between the vehicle 1 and the target vehicle 2 in advance.

The above-described embodiments may be embodied in the form of recording medium to store commands executable by a computer. The commands may be stored in the form of program codes, and when executed by a processor, the commands can create a program module to perform operations of the embodiments. The recording medium may be embodied as computer-readable recording medium.

The computer-readable recording medium may include all kinds of recording media storing commands that can be decoded by a computer. For example, the computer-readable recording medium may be Read Only Memory (ROM), Random Access Memory (RAM), a magnetic tape, a magnetic disk, flash memory, an optical data storage device, or the like.

As described above, according to the embodiments of the present disclosure, it is possible to perform effective collision avoidance control by sensing another vehicle approaching in a blind spot using a reflector installed at an intersection when the other vehicle is not recognized due to an obstacle located at the intersection. By transmitting a warning related to the sensed vehicle to a driver, the limitations of collision avoidance system can be overcome.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
   a communication device configured to receive information about a turn angle of an intersection at which the vehicle travels;
   an image sensor configured to photograph a reflector installed at the intersection to acquire an image of a target vehicle reflected in the reflector; and a controller configured to:
  determine whether the target vehicle approaches the intersection, based on a change in position of the target vehicle on the image of the target vehicle;
  determine a first installation angle of the reflector based on the turn angle of the intersection; and
  determine a position of the target vehicle reflected in the reflector based on the first installation angle of the reflector,
  wherein, when the target vehicle is at a first position, the controller calculates a first distance between the reflector and the target vehicle based on a relative position of the reflector and a relative position of the target vehicle reflected in the reflector,
  wherein, when the target vehicle is at a second position, the controller calculates a second distance between the reflector and the target vehicle based on the relative position of the reflector and the relative position of the target vehicle reflected in the reflector,
  wherein, when the first distance is longer than the second distance, the controller determines that the target vehicle approaches the intersection, and
  wherein, when the first distance is shorter than the second distance, the controller determines that the target vehicle moves away from the intersection.

2. The vehicle according to claim 1, wherein the controller calculates the relative position of the reflector based on a position of the vehicle, and calculates the relative position of the target vehicle reflected in the reflector based on the position of the vehicle.

3. The vehicle according to claim 2, wherein the controller calculates a distance between the reflector and the vehicle based on the relative position of the reflector.

4. The vehicle according to claim 2, wherein the controller determines a second installation angle of the reflector with respect to a driving direction of the vehicle, based on the relative position of the reflector.

5. The vehicle according to claim 4, wherein the controller calculates an angle between the target vehicle and the image of the target vehicle reflected in the reflector, based on the first installation angle of the reflector and the second installation angle of the reflector.

6. The vehicle according to claim 5, wherein the controller acquires position information of the target vehicle based on the angle between the target vehicle and the image of the target vehicle reflected in the reflector.

7. A vehicle control method comprising steps of:
  receiving, by a communication device, information about a turn angle of an intersection at which the vehicle travels;
  photographing, by an image sensor, a reflector installed at the intersection to acquire an image of a target vehicle reflected in the reflector;
  determining, by a controller, whether the target vehicle approaches the intersection, based on a change in position of the target vehicle on the image of the target vehicle;
  determining, by the controller, a first installation angle of the reflector based on the turn angle of the intersection;
  determining, by the controller, a position of the target vehicle reflected in the reflector based on the first installation angle of the reflector;
  when the target vehicle is at a first position, calculating a first distance between the reflector and the target vehicle based on a relative position of the reflector and a relative position of the target vehicle reflected in the reflector; and
  when the target vehicle is at a second position, calculating a second distance between the reflector and the target vehicle based on the relative position of the reflector and the relative position of the target vehicle reflected in the reflector, and
  wherein the step of determining whether the target vehicle approaches the intersection comprises:
    determining that the target vehicle approaches the intersection when the first distance is longer than the second distance; and
    determining that the target vehicle moves away from the intersection when the first distance is shorter than the second distance.

8. The vehicle control method according to claim 7, further comprising steps of, before the step of calculating a first distance:
  calculating the relative position of the reflector based on a position of the vehicle; and
  calculating the relative position of the target vehicle reflected in the reflector based on the position of the vehicle.

9. The vehicle according to claim 8, further comprising a step of calculating a distance between the reflector and the vehicle based on the relative position of the reflector.

10. The vehicle according to claim 8, further comprising a step of determining a second installation angle of the reflector with respect to a driving direction of the vehicle, based on the relative position of the reflector.

11. The vehicle according to claim 10, wherein the step of determining a position of the target vehicle reflected in the reflector comprises calculating an angle between the target vehicle and the image of the target vehicle reflected in the reflector, based on the first installation angle of the reflector and the second installation angle of the reflector.

12. The vehicle according to claim 11, wherein the step of determining a position of the target vehicle reflected in the reflector comprises acquiring position information of the target vehicle based on the angle between the target vehicle and the image of the target vehicle reflected in the reflector.

* * * * *